(12) United States Patent
Caraan et al.

(10) Patent No.: US 9,963,073 B1
(45) Date of Patent: May 8, 2018

(54) VEHICLE DOOR MIRROR ASSEMBLY (71) Applicant: Honda Motor Co., Ltd., Tokyo (JP)

(72) Inventors: Oscar A. Caraan, Raymond, OH (US);
Jacob A. Rothschild, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/374,261

(22) Filed: Dec. 9, 2016

(51) Int. Cl.
*B60R 1/062* (2006.01)
*G02B 7/198* (2006.01)

(52) U.S. Cl.
CPC ................... *B60R 1/062* (2013.01)

(58) Field of Classification Search
CPC .............................. B60R 1/062; G02B 7/198
USPC ........................................ 359/872, 876, 877
See application file for complete search history.

(56) References Cited

U.S. PATENT DOCUMENTS

| | | | |
|---|---|---|---|
| 3,044,359 A | 7/1962 | Zanetti-Streccia | |
| 7,324,261 B2 | 1/2008 | Tonar et al. | |
| 8,503,062 B2 | 8/2013 | Baur et al. | |
| 8,714,761 B2 | 5/2014 | Heger et al. | |
| 8,727,412 B2 | 5/2014 | Wolf et al. | |
| 8,827,517 B2 | 9/2014 | Cammenga et al. | |
| 8,915,601 B2 | 12/2014 | Foote et al. | |
| 9,056,584 B2 | 6/2015 | Fish, Jr. et al. | |
| 9,090,212 B2 | 7/2015 | De Wind et al. | |
| 9,205,780 B2 | 12/2015 | Habibi et al. | |
| 2015/0097955 A1* | 4/2015 | De Wind | B60R 1/062 348/148 |
| 2015/0224930 A1* | 8/2015 | Foote | B60R 1/074 359/872 |
| 2016/0137130 A1 | 5/2016 | Bing et al. | |
| 2016/0264054 A1* | 9/2016 | Uken | B60R 1/088 |
| 2017/0210294 A1* | 7/2017 | Mohan | B60R 1/04 |
| 2017/0248787 A1* | 8/2017 | Lee | G02B 27/0149 |

FOREIGN PATENT DOCUMENTS

| | | |
|---|---|---|
| DE | 3429493 A1 | 1/1972 |
| DE | 10334936 B3 | 3/2005 |
| DE | 102008013605 A1 | 9/2009 |
| JP | H0930329 A | 2/1997 |
| WO | 2010045989 A1 | 4/2010 |
| WO | 2013126791 A1 | 8/2013 |

\* cited by examiner

*Primary Examiner* — Frank Font
(74) *Attorney, Agent, or Firm* — Kenealy Vaidya LLP (57) ABSTRACT

A door mirror assembly is configured to be mounted on a support arm and a bracket, the door mirror assembly being moveable about the support arm and bracket via an actuator. The door mirror assembly includes a housing having a peripheral edge that defines an aperture. The door mirror assembly also includes a bezel having a mounting surface and an opposed surface, the opposed surface having a projecting edge extending therefrom by which the bezel is connected to the peripheral edge of the housing. The door mirror assembly further includes a mirror connected to the mounting surface of the bezel.

20 Claims, 5 Drawing Sheets

VEHICLE DOOR MIRROR ASSEMBLY

BACKGROUND

Vehicle door mirrors, particularly mirror assemblies with reflective glass that can rotate within a housing to adjust a driver's view through the mirror, promote enhanced visibility and safety during operation of the vehicle by enabling the driver to see areas around the vehicle that may otherwise be obstructed or out of view. Rotating the glass about the housing yields a larger housing size to accommodate rotational movement of the glass within the housing while maintaining clearance so edges of the housing do not interfere with glass rotation. This larger housing size can lead to degraded aerodynamics and appearance of the mirror assemblies, impeding vehicle performance and aesthetic design.

A need was identified for a vehicle door mirror assembly having a frameless appearance such that a housing is downsized to be flush with outer dimensions of the reflective glass.

SUMMARY

According to one aspect, a door mirror assembly is configured to be mounted on a support arm and a bracket, the door mirror assembly being moveable about the support arm and bracket via an actuator. The door mirror assembly includes a housing having a peripheral edge that defines an aperture. The door mirror assembly also includes a bezel having a mounting surface and an opposed surface, the opposed surface having a projecting edge extending therefrom by which the bezel is connected to the peripheral edge of the housing. The door mirror assembly further includes a mirror connected to the mounting surface of the bezel.

According to another aspect, a mirror assembly is configured to extend from a vehicle door. The mirror assembly includes a mirror body. The mirror body includes a housing having a peripheral edge of an aperture, a bezel having a mounting surface and an opposed surface, the opposed surface having a projecting edge extending therefrom by which the bezel is connected to the peripheral edge of the housing, and a mirror connected to the mounting surface of the bezel. The mirror assembly also includes an elongated mirror arm configured to extend from the vehicle door and support the mirror body. The mirror assembly further includes an actuator connected to the mirror body and the mirror arm, the actuator configured to rotate the mirror body about the mirror arm.

According to yet another aspect, a door mirror assembly is configured to include a bezel having a mounting surface and an opposed surface, and a mirror connected to the mounted surface. The door mirror assembly can also include a housing having a housing wall defining a cavity, the housing wall terminating at a peripheral edge that abuts the opposed surface of the bezel, the peripheral edge is stepped so as to form a channel that extends along the opposed surface of the bezel.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
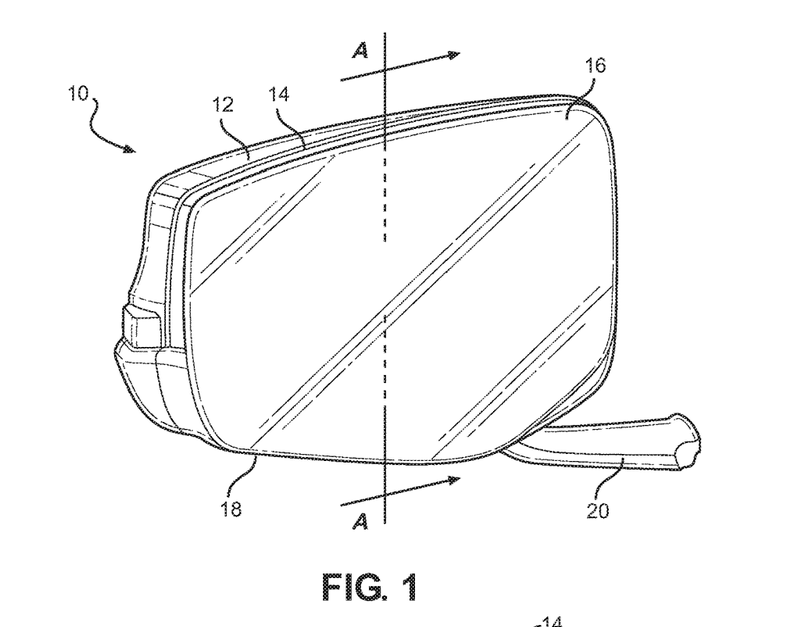
FIG. 1 is a perspective view of a first exemplary door mirror assembly of a vehicle in accordance with the disclosed subject matter.

FIG. 1 is a perspective view of a first exemplary door mirror assembly 10 of a vehicle in accordance with the disclosed subject matter. The exemplary door mirror assembly 10 is configured for attachment to a side door of a vehicle, specifically to a forward side of a front door.

The door mirror assembly 10 of the present embodiment includes a mirror 16 attached to a housing 12, the housing 12 having an assembly arm 20 extending therefrom for connection to a side door of a vehicle. As will be described below and shown in more detail in FIGS. 2-4, the door mirror assembly 10 is configured to have a frameless appearance. Specifically, a housing peripheral edge 14 of the housing 12 and a mirror peripheral edge 18 of the mirror 16 are sized and aligned to be flush with each other. Thus, when looking normal to the mirror 16, the housing 12 does not extend around any edge of the mirror 16, but instead is disposed behind the mirror 16.

The mirror 16 in the present embodiment can be a reflective glass plate. However, other materials having reflective surfaces may also be implemented as the mirror 16. Furthermore, the mirror 16 may be flat or may alternatively have a contoured surface so as to be convex or concave. As described below, a rear surface of the mirror 16 can be attached to the housing 12 via a bezel 22.

As described below, in order to bring the outer surface of the door mirror to the glass edge to form a frameless look and simultaneously form a rain groove, the bezel 22 (glass case) is extended to become a visible surface. The bezel 22 then serves the function of supporting the mirror 16 on one side and on the other side will form the rain groove (channel) with the housing 12.

Figure 2:
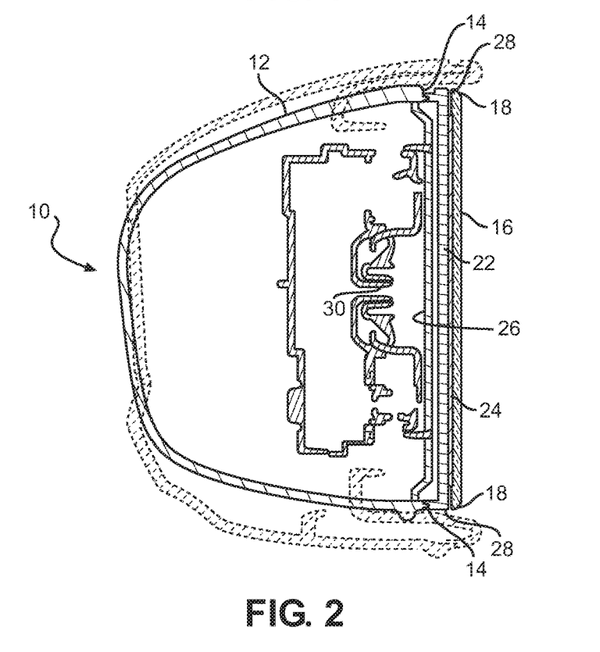
FIG. 2 is a cross-section view of the door mirror assembly of FIG. 1.

FIG. 2 is a cross-section view A-A of the door mirror assembly 10 of FIG. 1. In FIG. 2, the housing 12 of the present embodiment having a frameless appearance is shown overlaid with an exemplary housing of a traditional door mirror assembly in shadow. The traditional door mirror assembly shown in shadow is large enough to completely surround the mirror 16 on all side edges, resulting in a larger housing having greater surface area overall. In comparison, the door mirror assembly 10 of the present embodiment does not surround the mirror 16 edges but instead is made to meet the peripheral edge of the mirror 16. The housing 12 therefore removes excess material from around the glass and has an overall size reduction while providing the desired frameless appearance. Additionally, overall drag and aerodynamic properties, as well as appearance, are improved in the present embodiment.

As described below, because the mirror 16 is fixed to the housing 12 via a common plate, the entire housing 12 moves to adjust the mirror 16 for viewing by a vehicle operator. Particularly, the assembly arm 20 and an attached bracket are stationary parts which hold an actuator 46 for adjusting the housing 12 and attached mirror 16. The actuator 46 is thereby configured to rotate the visible parts (i.e., the mirror 16, the housing 12). The assembly arm 20 can be a mounting structure of appropriate length and shape configured to extend from a mounting point of the vehicle, such as the door or fender, to provide adequate field of view to the operator or driver viewing surroundings through the mirror 16.

In the present embodiment, the mirror 16 is connected to the housing 12 via a bezel 22 serving as a glass case. Specifically, the rear surface of the mirror 16 is adhered to a mounting surface of the bezel 22 via an adhesive 24. Therefore, the rear surface of the mirror 16 and the mounting surface of the bezel 22 may be configured to be flush with one another such that a bezel peripheral edge 28 extending around a perimeter of the bezel 22 is aligned with the mirror peripheral edge 18. The adhesive 24 can be, for example, double-sided tape, and may be disposed between the bezel 22 and the mirror 16 to maintain attachment therebetween. In some embodiments, other adhesives such as glue may be used, while still other embodiments may feature mechanical fasteners instead. The adhesive 24 can be configured to be removable and re-adhered between the bezel 22. The bezel 22, the mirror 16, and as will be described below, the adapter plate 26, can separate for (1) interchangeability of the mirror 16, the adhesive 24, and the adapter plate 26 (for using different types or curvatures of glass); and (2) easy removal of the mirror 16, the adhesive 24, and the bezel 22. This permits removal of the mirror 16 therefrom for repair or replacement.

The bezel 22 of the present embodiment is also configured to serve as an attachment point for the housing 12, connecting the mirror 16 to the housing peripheral edge 14. Specifically, the bezel 22 includes a bezel projecting edge 36 extending from the bezel peripheral edge 28 on an opposed surface opposite the mounting surface. The bezel projecting edge 36 extends approximately perpendicular from the opposed surface and may project along one or more portions of the bezel peripheral edge 28. In some embodiments, the bezel projecting edge 36 may even project along an entirety of the bezel peripheral edge 28 so as to follow the perimeter of the bezel 22. Consequently, the bezel projecting edge 36 is configured to abut facing surfaces of the housing peripheral edge 14. The bezel projecting edge 36 may therefore abut an entirety of the housing peripheral edge 14, or alternatively portions thereof.

As will be described below, the bezel projecting edge 36 can be held against the housing peripheral edge 14 by an adapter plate 26 disposed within the housing 12. The adapter plate 26 attaches the bezel 22 to the housing 12, and can also connect and support the actuator 46 within the housing 12.

Also described below, a portion of the bezel projecting edge 36 can be stepped so as to form a channel between the housing 12 and the bezel 22. The channel serves as a rain management system, and may disperse water and other liquids and substances from the door mirror assembly 10 and adjacent vehicle structures. The bezel 22 is thereby configured to include the bezel projecting edge 36 as an extended visible surface between the bezel peripheral edge 28 and the housing peripheral edge 14. Thus the bezel 22 serves to support the mirror 16 on one side and on the other side forms a rain groove (channel) with the housing 12.

Figure 3:
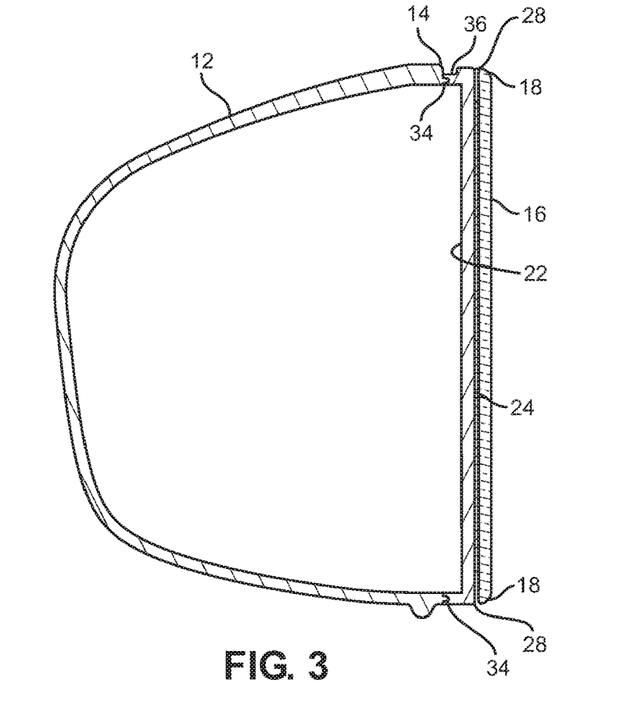
FIG. 3 is a cross-section view of a housing, a bezel and mirror of the door mirror assembly of FIG. 2.

FIG. 3 is a cross-section view of the housing 12, the bezel 22 and the mirror 16 of the door mirror assembly 10 of FIG. 2. In FIG. 3, components and structures configured to be disposed within the housing 12 are not shown for clarity.

In the present embodiment, the bezel 22 is connected to the housing 12 via the adapter plate 26 (not shown), and the mirror 16 is connected to the bezel 22 via the adhesive 24. The corresponding peripheral edges of the aforementioned structures are configured to align such that perimeters thereof are flush with one another, yielding a frameless appearance in a normal view to the mirror 16.

To maintain proper fitment between the bezel projecting edge 36 and the housing peripheral edge 14, the bezel projecting edge 36 is formed with a groove therein, the groove being formed within a surface facing the housing peripheral edge 14. The groove can extend along at least one portion of the bezel projecting edge 36 along the perimeter, or may alternatively extend along an entirety of the bezel projecting edge 36. The groove is formed to be complementary to a corresponding housing projection 34 extending from an opposing surface of the housing peripheral edge 14 such that the housing projection 34 can engage the groove. For example, the housing projection 34 is formed as a tongue and groove arrangement. The groove is therefore configured with a sufficient depth to accommodate the housing projection 34 for a secure fit therebetween. The groove and complementary housing projection 34 may extend along an entirety of respective perimeters of the bezel 22 and the housing 12, or may alternatively extend along corresponding portions thereof. The groove and the housing projection 34, in combination with the adapter plate 26, serve to promote secure fitment and connection between the bezel 22 and the housing 12. Secure fitment improves both performance and appearance of the door mirror assembly 10.

As shown in more detail in FIG. 4 and described below, a portion of the bezel projecting edge 36 can be stepped from the bezel peripheral edge 28 to form a channel between the bezel 22 and the housing 12. In the present embodiment, an upper portion of the bezel projecting edge 36 is stepped to form the channel, while a lower portion of the bezel projecting edge 36 is not stepped and remains flush with the adjacent portion of the housing peripheral edge 14. Intermediate portions of the bezel projecting edge 36 extending along sides between the upper and lower portions thereof may also be stepped such that the channel extends therein. The channel is thus configured to divert water and other liquids and substances along the upper portion and the sides of the door mirror assembly 10 as the substances flow with gravity around and away from the door mirror assembly 10. Alternatively, the intermediate portions of the bezel projecting edge 36 may be stepped gradually so as to transition between the channel formed in the upper portion of the bezel projecting edge 36 to the flush lower portion thereof.

The channel thereby serves as a catch for water or other liquids and substances to keep the mirror 16 and nearby door glass dry. Water or other liquids and substances caught by the channel travels around the bezel 22 until it reaches a bottom or outboard edge of the bezel peripheral edge 28 and detaches from the bezel 22.

Figure 4:
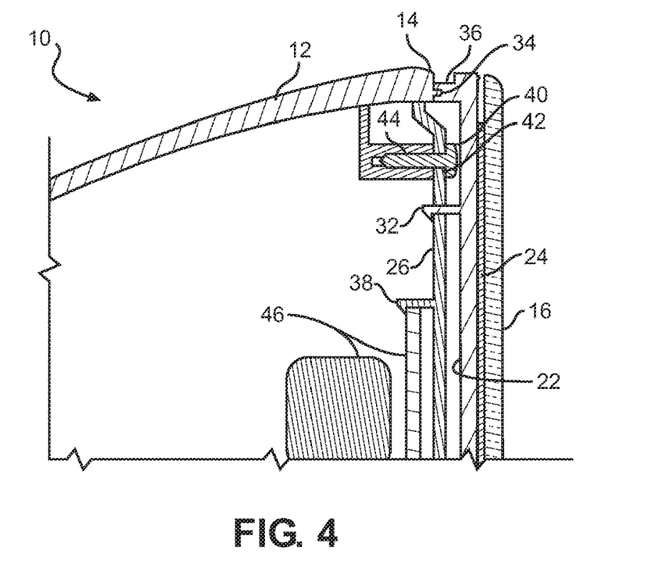
FIG. 4 is an enlarged cross-section view of part of the door mirror assembly of FIG. 2.

FIG. 4 is an enlarged cross-section view of part of the door mirror assembly 10 of FIG. 2. Specifically, FIG. 4 shows a cross-section view of the upper portion of the door mirror assembly 10, including the channel formed in the bezel projecting edge 36. The stepped channel in the bezel projecting edge 36 of the present embodiment is formed with a rectangular cross-section, however other cross-section shapes are possible such as semicircular, triangular, etc.

As described above, the bezel 22 is attached to the adapter plate 26. In the present embodiment, bezel clips 32 extend from the opposed surface of the bezel 22 towards the adapter plate 26. The bezel clips 32 can extend through corresponding apertures in the adapter plate 26, and can include hooks to secure the bezel 22 against the adapter plate 26. By virtue of the bezel 22 being connected to the adapter plate 26, the bezel projecting edge 36 abuts and maintains contact with the housing peripheral edge 14.

The adapter plate 26 is configured to be attached to and disposed within the housing 12, thereby serving to secure the bezel 22 to the housing 12. In the present embodiment, the adapter plate 26 extends approximately along the bezel 22, spanning the opening to the cavity in the housing 12. The adapter plate 26 can thus abut inner walls of the housing 12 along the housing peripheral edge 14. Specifically, the adapter plate 26 can include adapter clips 38 extending therefrom towards the cavity of the housing 12. The adapter clips 38 can include hooks configured to extend around the actuator 46 such that the adapter clips 38 hold the adapter plate 26 against the actuator 46, which is attached to the housing 12. The adapter plate 26 of the present embodiment is additionally attached to the housing via fasteners 40 inserted through corresponding adapter apertures 42 in the adapter plate 26. The fasteners 40 extend through the adapter apertures 42 and into housing openings 44 formed in brackets extending into the interior of the housing 12. Specifically, the brackets in which the housing openings 44 are formed extend from the inner walls of the housing proximate the housing peripheral edge 14. The fasteners 40, in conjunction with the adapter clips 38, serve to secure the adapter plate 26 within the housing 12 and thereby secure the bezel 22 and attached mirror 16 to the housing 12 as well. The fasteners 40 can be optionally threaded fasteners 40. Consequently, the adapter plate 26 can serve to improve datum/fit and finish for the bezel 22 to the housing 12 while attaching the bezel 22 to the actuator 46. The present embodiment, the door mirror assembly 10 may include four of the fasteners 40 to connect the adapter plate 26 to the housing 12. However, alternate embodiments may include any appropriate number of the fasteners 40 such as one, two, three, four, five, etc., or in some embodiments, none of the fasteners 40 may be included.

The disposition of the adapter plate 26 within the housing 12 of the present embodiment exerts a pressing force outward on the inner walls thereof, particularly on the upper and lower portions of the housing peripheral edge 14. Consequently, the housing projection 34 extending from the housing peripheral edge 14 is also pressed outward. This causes the housing projection 34 to transfer and exert a pressing force against inner surfaces of the groove in the bezel projecting edge 36 within which the housing projection extends. Because the bezel projecting edge 36, and the groove formed therein, is relatively fixed on the opposed surface of the bezel 22 along the bezel peripheral edge 28, the pressing force of the housing projection 34 on the groove surfaces ensures tight and secure fitment therebetween, rather than deforming the bezel projecting edge 36 outward. For purposes of the present embodiments, the housing projection(s) 34 extending along the upper and lower portions of the bezel peripheral edge 28 exert outward pressing forces such that the upper housing projection 34 presses against an upper inner surface of the groove, while the lower housing projection 34 presses against a lower inner surface of the groove. The bezel 22 pushing the housing 12 down while the adapter plate 26 pushes the housing 12 up ensures that the joint has a tight fit.

As described above, the actuator 46 of the present embodiment is disposed within the interior cavity of the housing 12 and connects to the adapter plate 26. The actuator 46 can include a ball and socket, pins, rods, etc., or any other alternative structures to facilitate rotational movement of the actuator plate 26. The actuator 46 may additionally include structures and hardware to facilitate lateral/transverse movement of the actuator plate 26.

The actuator 46 in the present embodiment can be directly or indirectly actuated mechanically or electrically. For example, the actuator 46 may be manually actuated, or remotely actuated via interior switches within the vehicle interior. Additionally, the actuator 46 may be automatically actuated upon occurrence of certain events or issuance of commands such as drive modes by the vehicle and operator.

Figure 5:
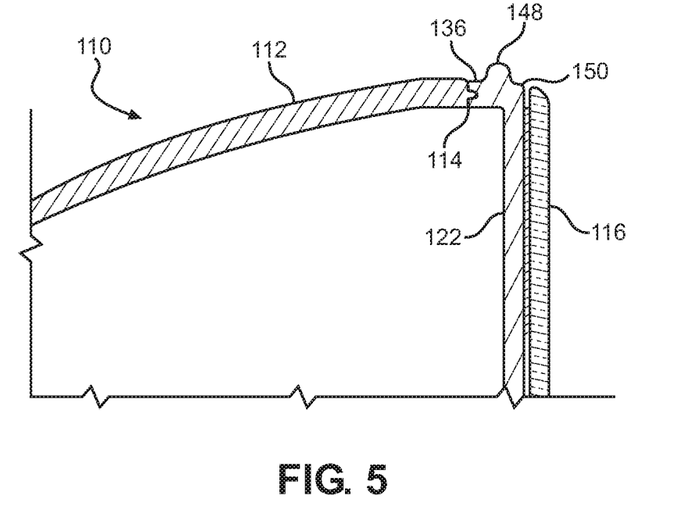
FIG. 5 is a partial cross-sectional view of a housing, a bezel and a mirror of a second exemplary door mirror assembly.

FIG. 5 illustrates a second exemplary door mirror assembly 110 that can include each of the structures, connections and interactions as described above with respect to FIGS. 1-4, and can include the modifications described below. For example, the door mirror assembly 110 can include a housing 112, a mirror 116 and a bezel 122 that can be assembled in the manner described above with respect to FIGS. 1-4. The door mirror assembly 110 also can include an actuator connected to the bezel 122 as described above with respect to FIGS. 1-4.

The door mirror assembly 110 can include a rib 148— instead of the channel described above—that can serve as a rain management system. The bezel 122 can include the rib 148 extending outwardly from a top surface of the bezel 122. The rib 148 can project a distance sufficient that the rib 148 extends to a level that is above the upper surface of the housing 112. The rib 148 can extend across the top of the bezel 122 from one side of the door mirror assembly 110 to the other side of the door mirror assembly 110, as described above with respect to the channel of FIGS. 1-4. Thus, the rib 148 can block water that flows across the upper surface of the housing 112 in a direction toward the mirror 116. Further, the rib 148 can divert water and other liquids and substances along the upper portion and the sides of the door mirror assembly 110 as the substances flow with gravity around and away from the door mirror assembly 110. The rib 148 can thereby reduce or eliminate the flow of liquid and other substances onto the mirror 116.

The rib 148 can be spaced inwardly away from each of the front corner 150 of the mounting surface of the bezel 122 and the bezel projecting edge 136. The rib 148 can be located adjacent the bezel projecting edge 136 and be spaced away from the housing peripheral edge 114 by the bezel projecting edge 136. If the rib 148 is spaced away from the housing peripheral edge 114, then the thickness of the housing 112 at the housing peripheral edge 114 can be reduced.

Figure 6:
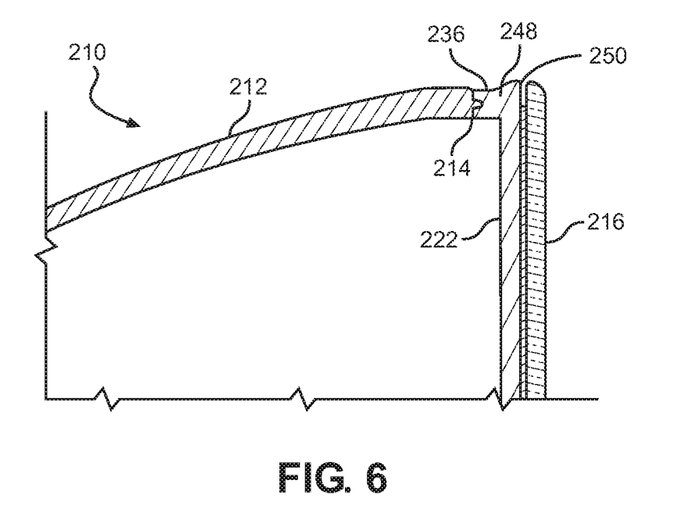
FIG. 6 is a partial cross-sectional view of a housing, a bezel and a mirror of a third exemplary door mirror assembly.

FIG. 6 illustrates a third exemplary door mirror assembly 210 that can include each of the structures, connections and interactions as described above with respect to FIGS. 1-4, and can include the modifications described below. For example, the door mirror assembly 210 can include a housing 212, a mirror 216 and a bezel 222 that can be assembled in the manner described above with respect to FIGS. 1-4. The door mirror assembly 210 also can include an actuator connected to the bezel 222 as described above with respect to FIGS. 1-4.

The door mirror assembly 210 can include a rib 248—instead of the channel described above—that can serve as a rain management system. The bezel 222 can include the rib 248 extending outwardly from a top surface of the bezel 222. The rib 248 can project a distance sufficient that the rib 148 extends to a level that is above the upper surface of the housing 212. The rib 248 can extend across the top of the bezel 222 from one side of the door mirror assembly 210 to the other side of the door mirror assembly 210, as described above with respect to the channel of FIGS. 1-4. Thus, the rib 248 can block water that flows across the upper surface of the housing 212 in a direction toward the mirror 216. Further, the rib 248 can divert water and other liquids and substances along the upper portion and the sides of the door mirror assembly 210 as the substances flow with gravity around and away from the door mirror assembly 210. The rib 148 can thereby reduce or eliminate the flow of liquid and other substances onto the mirror 216.

The rib 248 can abut the front corner 250 of the mounting surface of the bezel 222. The rib 248 can be located adjacent the bezel projecting edge 236 and be spaced away from the housing peripheral edge 214 by the bezel projecting edge 236. If the rib 248 is spaced away from the housing peripheral edge 214, then the thickness of the housing 212 at the housing peripheral edge 214 can be reduced.

Figure 7:
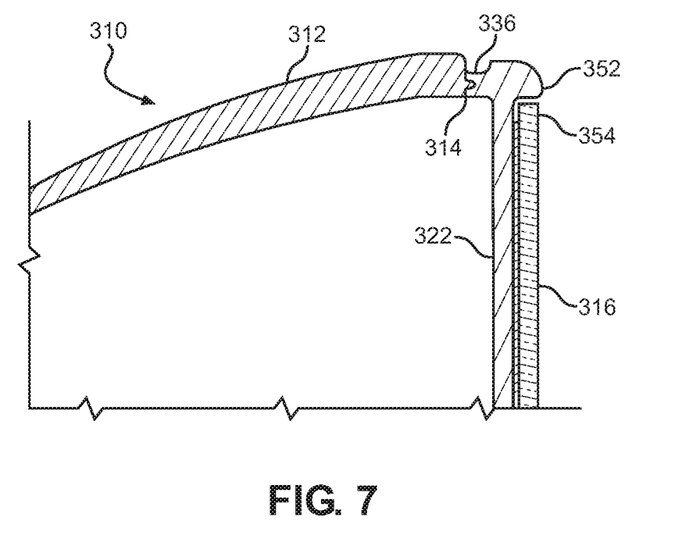
FIG. 7 is a partial cross-sectional view of a housing, a bezel and a mirror of a fourth exemplary door mirror assembly.

FIG. 7 illustrates a fourth exemplary door mirror assembly 310 that can include each of the structures, connections and interactions as described above with respect to FIGS. 1-4, and can include the modifications described below. For example, the door mirror assembly 310 can include a housing 312, a mirror 316 and a bezel 322 that can be assembled in the manner described above with respect to FIGS. 1-4. The door mirror assembly 310 also can include an actuator connected to the bezel 322 as described above with respect to FIGS. 1-4.

The bezel 322 can include a framing projection 352 that extends from the mounting surface and around the perimeter of the bezel 322 to surround the mirror 316. The framing projection 352 can project from the bezel 322 in a direction toward the mirror 316 a distance sufficient to encircle an outer edge 354 of the mirror 316. That is, the framing projection 352 can frame the mirror 316.

Figure 8:
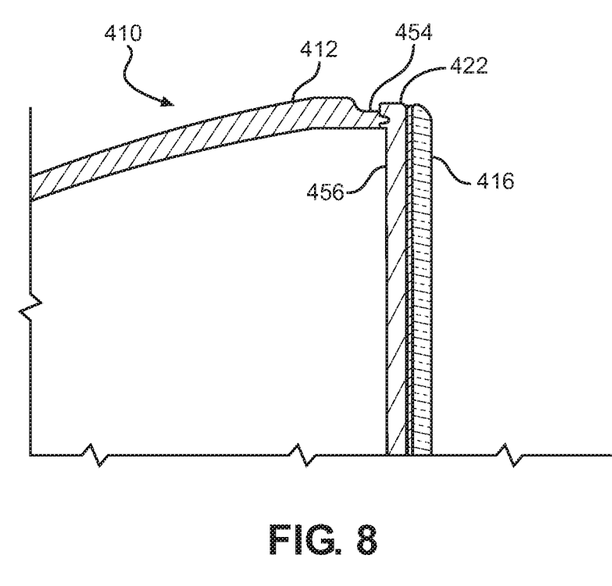
FIG. 8 is a partial cross-sectional view of a housing, a bezel and a mirror of a fifth exemplary door mirror assembly.

FIG. 8 illustrates a fifth exemplary door mirror assembly 410 that can include each of the structures, connections and interactions as described above with respect to FIGS. 1-4, and can include the modifications described below. For example, the door mirror assembly 410 can include a housing 412, a mirror 416 and a bezel 422 that can be assembled in the manner described above with respect to FIGS. 1-4. The door mirror assembly 410 also can include an actuator connected to the bezel 422 as described above with respect to FIGS. 1-4.

Instead of the bezel 422 including a bezel projecting edge as described above with respect to FIGS. 1-4, the housing 412 can include a housing projecting edge 454. A portion of the housing projecting edge 454 can be stepped so as to form a channel that extends between the housing 412 and the bezel 422. The channel serves as a rain management system, and may disperse water and other liquids and substances from the door mirror assembly 410 and adjacent vehicle structures. The housing 412 is thereby configured to include the housing projecting edge 454 as an extended visible surface between the bezel rear face 456 and the housing projecting edge 454. Thus the bezel 422 serves to support the mirror 416 on one side and on the other side forms a rain groove (channel) with the housing 412.

Figure 9:
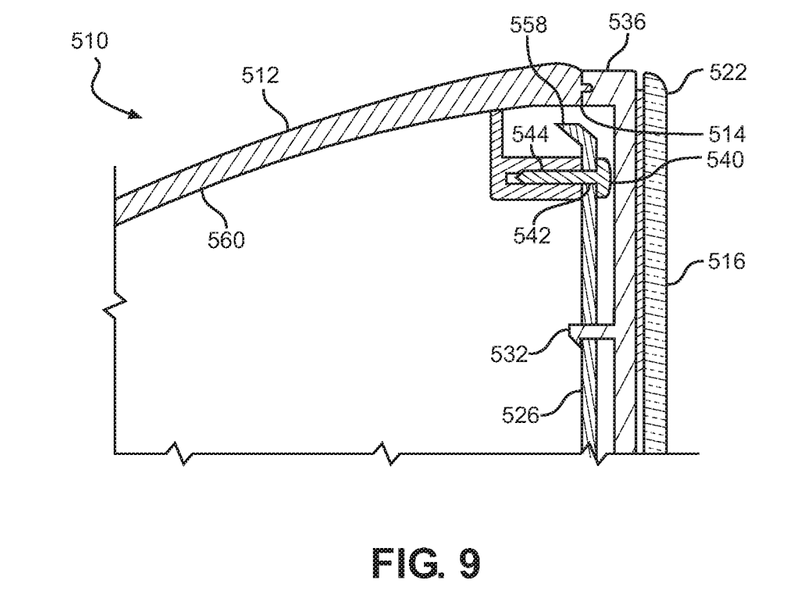
FIG. 9 is a partial cross-sectional view of a housing, a bezel and a mirror of a sixth exemplary door mirror assembly.

FIG. 9 illustrates a sixth exemplary door mirror assembly 510 that can include each of the structures, connections and interactions as described above with respect to FIGS. 1-4, and can include the modifications described below. For example, the door mirror assembly 510 can include a housing 512 (having a housing aperture 544), a mirror 510, a bezel 522, an adapter plate 526 (having a adapter aperture 542), a bezel clip 532 and a fastener 540, that can be assembled in the manner described above with respect to FIGS. 1-4. The door mirror assembly 510 also can include an actuator connected to the bezel 522 as described above with respect to FIGS. 1-4.

Instead of being stepped, the bezel projecting edge 536 can cooperate with the housing peripheral edge 514 to define a substantially flush joint between the housing 512 and the bezel 522. That is, the channel described above with respect to FIGS. 1-4 can be omitted, as desired.

Further, the plate peripheral edge 558 of the adapter plate 526 can be spaced away from the housing inner surface 560 of the housing 512 so that a gap exists between the plate peripheral edge 558 and the housing inner surface 560.

While certain embodiments of the invention are described above, and FIGS. 1-9 disclose the best mode for practicing the various inventive aspects, it should be understood that the invention can be embodied and configured in many different ways without departing from the spirit and scope of the invention.

For example, embodiments are disclosed above in the context of the door mirror assembly 10 configured to be mounted on a support arm and a bracket of a vehicle, as described above. However, embodiments are intended to include or otherwise cover door mirror assemblies configured for use with any type of mounting structure and vehicle.

The embodiments of the door mirror assembly disclosed above incorporate the channel and/or ribs described and shown in FIGS. 1-9 to illustrate exemplary rain management systems. However, other configurations of ribs and channels surrounding portions, specifically a top portion, of the mirror assembly may be appropriate.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

The embodiments disclosed above are also intended to be used with motorcycles and three-wheel vehicles, as well as open-cab vehicles such as ATVs having side mirror assemblies. Such mirror assemblies can be configured to extend from alternate structures of the motorcycle or three-wheel vehicle, as well as open-cab vehicles such as ATVs, such as a steering rack or column, instrument cluster, fenders, etc., rather than from doors. Furthermore, four-wheel vehicles without doors may be configured with the disclosed mirror assemblies extending from any appropriate structure such as A-pillars, front fenders, hood, ingress/egress openings, etc. Such configurations also apply to vehicles having more than four wheels.

The embodiments are also intended to be used with non-motorized vehicles, such as bicycles and other pedal-propelled or man-powered transportation devices. Similarly to motorcycles and ATVs, bicycles may have the mirror assemblies described above connected to handlebars or any other suitable structure.

Embodiments are also intended to include or otherwise cover methods of using and methods of manufacturing any or all of the elements disclosed above. The methods of manufacturing include or otherwise cover processors and computer programs implemented by processors used to design various elements of the door mirror assembly disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A door mirror assembly configured to be mounted on a support arm, the door mirror assembly being moveable about the support arm via an actuator, the door mirror assembly comprising:
    a housing having a peripheral edge that defines an aperture;
    a bezel having a mounting surface and an opposed surface, the opposed surface having a projecting edge extending therefrom by which the bezel is connected to the peripheral edge of the housing, the projecting edge being stepped so as to define an outward facing channel therein; and
    a mirror connected to the mounting surface of the bezel.

2. The door mirror assembly according to claim 1, wherein the peripheral edge of the housing includes at least one housing projection disposed along a portion thereof, the housing projection configured to extend within a bezel groove disposed along a corresponding portion of the projecting edge of the bezel.

3. The door mirror assembly according to claim 2, wherein the at least one housing projection is configured to extend along opposing portions of the peripheral edge of the housing, and the bezel groove is disposed along corresponding opposing portions of the projecting edge of the bezel.

4. The door mirror assembly according to claim 3, wherein an upper wall of the housing has an increased thickness approaching the peripheral edge thereof.

5. The door mirror assembly according to claim 4, wherein the portion of the projecting edge of the bezel along which the bezel groove is disposed is stepped so as to form a channel between the peripheral edge of the housing and the bezel.

6. The door mirror assembly according to claim 5, further comprising an adapter plate disposed within the housing and connected to the opposing surface of the bezel, the adapter plate configured to connect the bezel to the actuator.

7. The door mirror assembly according to claim 6, wherein the adapter plate is configured to extend between the opposing portions of the peripheral edge of the housing so as to press against inner walls thereof.

8. The door mirror assembly of claim 7, wherein the adapter plate is configured to press an outward-facing surface of the at least one housing projection against a complementary inward-facing surface of the bezel groove such that the bezel maintains connection with the housing.

9. The door mirror assembly according to claim 1 wherein a peripheral edge of the mirror is configured to be substantially flush with a peripheral edge of the bezel.

10. The door mirror assembly according to claim 9, wherein the peripheral edge of the mirror and the peripheral edge of the bezel are configured to be substantially flush with at least a portion of the peripheral edge of the housing.

11. A mirror assembly configured to extend from a vehicle door, the mirror assembly comprising:
    a mirror body including:
        a housing having a peripheral edge of an aperture;
        a bezel having a mounting surface and an opposed surface, the opposed surface having a projecting edge extending therefrom by which the bezel is connected to the peripheral edge of the housing, the projecting edge being stepped so as to define an outward facing channel therein; and
        a mirror connected to the mounting surface of the bezel;
    an elongated mirror arm configured to extend from the vehicle door and support the mirror body; and
    an actuator connected to the mirror body and the mirror arm, the actuator configured to rotate the mirror body about the mirror arm.

12. The door mirror assembly according to claim 11, wherein the peripheral edge of the housing includes at least one housing projection configured to extend along opposing portions of the peripheral edge of the housing, the housing projection configured to extend within a bezel groove disposed along corresponding opposing portions of the projecting edge of the bezel.

13. The door mirror assembly according to claim 12, further comprising an adapter plate disposed within the housing and connected to the opposing surface of the bezel, the adapter plate configured to connect the bezel to the actuator, and the adapter plate is configured to extend between the opposing portions of the peripheral edge of the housing so as to press against inner walls thereof.

14. The door mirror assembly of claim 13, wherein the adapter plate is configured to press an outward-facing surface of the at least one housing projection against a complementary inward-facing surface of the bezel groove such that the bezel maintains connection with the housing.

15. The door mirror assembly according to claim 11, wherein the bezel includes a rib extending outwardly from a top surface of the bezel.

16. The door mirror assembly according to claim 15, wherein the rib abuts the mounting surface of the bezel.

17. The door mirror assembly according to claim 15, wherein the rib is spaced away from each of the mounting surface of the bezel and the projecting edge of the bezel.

18. The door mirror assembly according to claim 11, wherein the housing having a housing wall defining a cavity, the housing wall terminating at the peripheral edge and having a first thickness at the peripheral edge, the bezel including a glass support body having a second thickness, and the peripheral projection having a third thickness that is less than that of the first thickness and the second thickness such that a channel is formed between the housing wall and the glass support body.

19. The door mirror assembly according to claim 11 wherein the bezel includes a framing projection that extends from the mounting surface and surrounds the mirror.

20. A door mirror assembly comprising:
- a bezel having a mounting surface and an opposed surface;
- a mirror connected to the mounting surface of the bezel;
- a housing having a housing wall defining a cavity, the housing wall terminating at a peripheral edge that abuts the opposed surface of the bezel, the peripheral edge is stepped so as to form a channel that extends along the opposed surface of the bezel.

* * * * *